(12) United States Patent
Munk et al.

(10) Patent No.: US 11,074,216 B2
(45) Date of Patent: *Jul. 27, 2021

(54) SOURCE TYPE DEFINITION CONFIGURATION USING A GRAPHICAL USER INTERFACE

(71) Applicant: Splunk Inc., San Francisco, CA (US)

(72) Inventors: Alexander D. Munk, San Francisco, CA (US); Jesse Miller, Piedmont, CA (US)

(73) Assignee: Splunk Inc., San Francisco, CA (US)

( * ) Notice: Subject to any disclaimer, the term of this patent is extended or adjusted under 35 U.S.C. 154(b) by 485 days.

This patent is subject to a terminal disclaimer.

(21) Appl. No.: 16/013,381

(22) Filed: Jun. 20, 2018

(65) Prior Publication Data

US 2018/0300349 A1 Oct. 18, 2018

Related U.S. Application Data

(63) Continuation of application No. 14/611,010, filed on Jan. 30, 2015, now Pat. No. 10,037,331.

(51) Int. Cl.
*G06F 16/13* (2019.01)
*G06F 16/14* (2019.01)
(Continued)

(52) U.S. Cl.
CPC ............ *G06F 16/13* (2019.01); *G06F 3/0482* (2013.01); *G06F 16/148* (2019.01); *G06F 16/168* (2019.01); *G06F 16/951* (2019.01)

(58) Field of Classification Search
CPC ...... G06F 16/13; G06F 16/148; G06F 16/168; G06F 16/951
(Continued)

(56) References Cited

U.S. PATENT DOCUMENTS 7,937,344 B2 5/2011 Baum et al.
8,112,425 B2 2/2012 Baum et al.
(Continued)

OTHER PUBLICATIONS

Vaid, Workshop on Managing Systems via log Analysis and Machine Learning Techniques (SLAML '10), ;login: vol. 36, No. 1, Oct. 3, 2010, Vancouver, BC, Canada.
(Continued)

*Primary Examiner* — Joshua Bullock
(74) *Attorney, Agent, or Firm* — Knobbe, Martens, Olson & Bear, LLP

(57) ABSTRACT

A data intake and query system provides interfaces that enable users to configure source type definitions used by the system. A data intake and query system generally refers to a system for collecting and analyzing data including machine-generated data. Such a system may be configured to consume many different types of machine data generated by any number of different data sources including various servers, network devices, applications, etc. At a high level, a source type definition comprises one or more properties that define how various components of a data intake and query system collect, index, store, search and otherwise interact with particular types of data consumed by the system. The interfaces provided by the system generally comprise one or more interface components for configuring various attributes of a source type definition.

30 Claims, 17 Drawing Sheets

(51) Int. Cl.
　　　*G06F 16/16*　　　(2019.01)
　　　*G06F 16/951*　　(2019.01)
　　　*G06F 3/0482*　　(2013.01)

(58) Field of Classification Search
　　　USPC .......................................................... 707/741
　　　See application file for complete search history.

(56) References Cited

U.S. PATENT DOCUMENTS

| | | | |
|---|---|---|---|
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,037,331 B2 | 7/2018 | Munk et al. | |
| 10,127,258 B2 | 11/2018 | Lamas et al. | |
| 2004/0225763 A1* | 11/2004 | Carroll .................. | G06F 3/0683 710/36 |
| 2014/0029615 A1* | 1/2014 | Baldwin ............. | H04L 67/2828 370/392 |
| 2019/0098106 A1 | 3/2019 | Mungel et al. | |

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Carraso, David, "Exploring Splunk," published by CITO Research, New York, NY, Apr. 2012.

SLAML 10 Reports, Workshop on Managing Systems via Log Analysis and Machine Learning Techniques, ;login: Feb. 2011 Conference Reports.

Splunk Enterprise 8.0.0 Overview, available online, retrieved May 20, 2020 from docs.splunk.com.

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

* cited by examiner

Search Screen 600

| Search | Pivot | Reports | Alerts | Dashboards | | Search & Reporting |

Q New Search                                                         Save as menu → Save As ∨   Close buttercupgames  Search Bar 602                          Time Range Picker 612 → All time ∨   Q ✓ 36,819 events (before 4/30/14 2:19:02.000 PM)     Job ∨  ■ ■ ▲ ⇩ ⊖   ● Smart Mode ∨

Events (36,819) | Statistics | Visualization ← Search Results Tabs 604    Search mode selector Format Timeline ∨   − Zoom Out   + Zoom to Selection   × Deselect     ← Search action buttons Timeline 605
                                                                                1 hour per column < Prev  1  2  3  4  5  6  7  8  9  ...  Next >

List ∨    Format ∨   20 Per Page ∨

< Hide Fields   ::: All Fields | i | Time | Event
Fields Sidebar 606                                 Events List 608

Selected Fields
a host 3              > | 4/28/14         | 91.205.189.15 - - [28/Apr/2014:18:22:16] "GET /oldlink?itemId=EST-14&JSESSIONID=SD6SL7FF
a source 3              | 6:22:16.000 PM  | 7ADFF53113 HTTP 1.1" 200 1665 "http://www.buttercupgames.com/oldlink?itemId=EST-14" "Moz
a sourcetype 1          |                 | illa/5.0 (Windwos NT 6.1; WOW 64) AppleWebKit/536.5 (KHTML, like Gecko) Chrome/19.0.1084.
                        |                 | 46 Safari/536.5" 159
Interesting Fields  |                 | host = www2    source = tutorialdata.zip:./www2/access.log    sourcetype = access_combined_wcookie
a action 5
bytes 100+          > | 4/28/14         | 182.236.164.11 - - [28/Apr/2014:18:20:56] "GET /cart.do?action=addtocart&itemId=EST-15&p
a categoryId 8          | 6:20:56.000 PM  | roductId=85-AG-G09&JSESSIONID=SD6SL8FF10ADFF53101 HTTP 1.1" 200 2252 "http://www.butterc
a clientip 100+         |                 | upgames.com/oldlink?itemId=EST-15" "Mozilla/5.0 (Macintosh; Intel Mac OS X 10_7_4) Apple
date_hour 24          |                 | WebKit/536.5 (KHTML, like Gecko) Chrome/19.0.1084.46 Safari/536.5" 506
date_mday 8           |                 | host = www1    source = tutorialdata.zip:./www1/access.log    sourcetype = access_combined_wcookie
date_minute 60
                      > | 4/28/14         | 182.236.164.11 - - [28/Apr/2014:18:20:56] "POST /oldlink?itemId=EST-18&JSESSIONID=SD6SL8
                        | 6:20:55.000 PM  | FF10ADFF53101 HTTP 1.1" 408 893 "http://www.buttercupgames.com/product.screen?productId=
                        |                 | SF-BVS-G01" "Mozilla/5.0 (Macintosh; Intel Mac OS X 10_7_4) AppleWebKit/536.5 (KHTML, li
                        |                 | ke Gecko) Chrome/19.0.1084.46 Safari/536.5" 134
                        |                 | host = www1    source = tutorialdata.zip:./www1/access.log    sourcetype = access_combined_wcookie

FIG. 6A

| Data Summary | | | |
|---|---|---|---|
| Hosts (5) | Sources (8) | Sourcetypes (3) | |
| filter | | | |
| Host ◊ | | Count ◊ | Last Update ◊ |
| mailsv | ⋅ıl ∨ | 9,829 | 4/29/14 1:32:47.000 PM |
| vendor_sales | ⋅ıl ∨ | 30,244 | 4/29/14 1:32:46.000 PM |
| www1 | ⋅ıl ∨ | 24,221 | 4/29/14 1:32:44.000 PM |
| www2 | ⋅ıl ∨ | 22,595 | 4/29/14 1:32:47.000 PM |
| www3 | ⋅ıl ∨ | 22,975 | 4/29/14 1:32:45.000 PM |

FIG. 6B

Preview Data

Data preview lets you see what your data will look like before Splunk En next step. If not, use the options below to help define event breaks and r identified automatically) you will need to create a sourcetype by clicking

Source: alcatel.log

Sourcetype: New Sourcetype ⌄     Save As...

▷ Event Breaks

1102 → Break Type  [Auto] [Every Line] [Regex...]

▷ Timestamp

1104 → Extraction  [Auto] [Current time] [Advanced...]
Timestamp format  [                    ]
TODO ▷ Advanced

| Name | Value | |
|---|---|---|
| CHARSET | UTF-8 | ⊗ |
| NO_BINARY_CHECK | true | ⊗ |
| disabled | false | ⊗ |

1106 →

New setting
Copy to clipbord

▷ Delimited settings

1108 → Field delimiter  [(comma) , ⌄]
Quote character  [(doube quote) " ⌄]
File preamble  [                    ]

A regular expression which instructs Splunk to ignore these preamble lines within the file Field names  [Auto] [Line...] [Custom...] [Regex...]

Splunk> Apps ∨    Administrator ∨   Messages ∨   Settings ∨   Activity ∨   Help ∨    [Find]

Add Data
Select Source — Set Sourcetype — Input Settings — Review — Done   [<] [Next>]

Set Sourcetype
Data preview lets you see how splunk see your data before indexing. If the events look correct and have the right timestamps, click 'Next' to proceed. If not, use the options below to define proper event breaks and timestamps. If you cannot find an appropriate source type for your data, create a new one by clicking 'Save As'.

Source: C:\Windows\WindowsUpdate.log

Sourcetype: New Sourcetype ∨   [Save As]     List ∨   Format ∨   20 Per Page ∨    < Prev [1] 2 3 4 5 6 7 8 9 ... next >    View Event Summary — 1202

| # | Time | Event | | | | |
|---|---|---|---|---|---|---|
| 1 | 6/3/14<br>8:57:30.694 AM | 2014-06-03 | 08:57:30.694 | 836 | 105c | Misc | WARNING: Send failed with hr =80070008. |
| 2 | 6/3/14<br>8:57:30.694 AM | 2014-06-03 | 08:57:30.694 | 836 | 105c | Misc | WARNING: SendRequest failed with hr = 80070008. Proxy List used : <(null)> Bypass List used : <(null)> Auth Schemes used : <> |
| 3 | 6/3/14 | 2014-06-03 | 08:57:30.694 | 836 | 105c | PT | + Last proxy send request f |

> Event Breaks
> Timestamp
> Advanced

SOURCE TYPE DEFINITION CONFIGURATION USING A GRAPHICAL USER INTERFACE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD OF THE DISCLOSURE

The present disclosure generally relates to configuration of a data intake and query system and, more particularly, to customizing configuration parameters related to processing types of data that may be provided as input to the system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Modern data centers and other computing environments often comprise anywhere from a few devices to thousands of computing devices that process various types of data, service requests from an even larger numbers of remote clients, and perform many other computing functions. During operation, many of these devices may include components that produce significant volumes of machine-generated data. For example, many of the devices may include components that produce various types of log files, output files, network data, etc.

Analysis of data generated by such computing devices may yield valuable insight into both the overall operation of such computing environments and individual components thereof. However, the unstructured nature of much of this data presents a number of challenges to analysis in part because of the difficulty of applying semantic meaning to unstructured data. Furthermore, the data generated by the computing devices may vary widely both in the type and format of the data. As the number computing devices that generate various forms of machine data continues to grow, processing and analyzing large volumes of such machine data in an intelligent manner and effectively presenting the results of such analysis remains a priority.

BRIEF DESCRIPTION OF THE DRAWINGS

In the drawings:

FIG. 6A illustrates a search screen in accordance with the disclosed embodiments;

FIG. 6B illustrates a data summary dialog that enables a user to select various data sources in accordance with the disclosed embodiments;

FIG. 11 depicts a portion of an example graphical user interface displaying interface components for configuring a source type definition;

FIG. 12 depicts a portion of an example graphical user interface for previewing a source type configuration;

DETAILED DESCRIPTION

Figure 1:
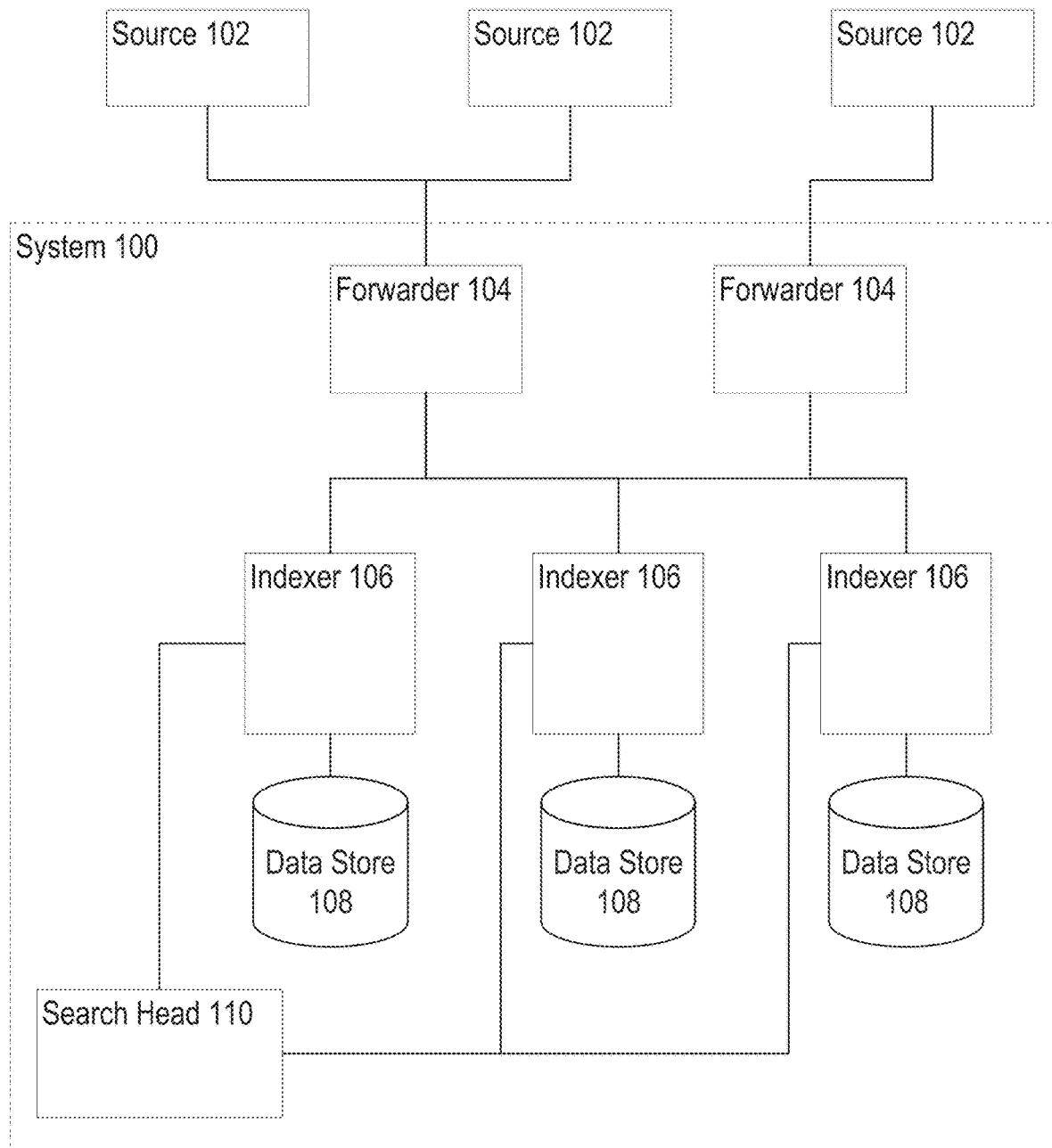
FIG. 1 illustrates a block diagram of an example data intake and query system in which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
    2.0. Operating Environment
    2.1. System Overview
    2.2. Data Server System
    2.3. Source Types Overview
    2.4. Data Ingestion
        2.4.1. Input
        2.4.2. Parsing
        2.4.3. Indexing
    2.5. Query Processing
    2.6. Field Extraction
    2.7. Example Search Screen
    2.8. Acceleration Techniques
        2.8.1. Map-Reduce Technique
        2.8.2. Keyword Index
        2.8.3. High Performance Analytics Store
        2.8.4. Accelerating Report Generation
    2.9. Security Features
    2.10. Data Center Monitoring 2.11. Cloud-Based System Overview
3.0 Source Type Management
3.1. Configuring Source Types
3.2. Synchronizing Source Type Definitions
4.0. Implementation Mechanisms—Hardware Overview
5.0. Example Embodiments
6.0. Extensions and Alternatives

1.0. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

The present disclosure is directed to systems and techniques for enabling users to configure source type definitions used by a data intake and query system. An example data intake and query system as described herein generally refers to a system for collecting and analyzing data including machine-generated data. Such a system may be configured to consume many different types of machine data generated by any number of different data sources, including machine data generated by various servers, network devices, applications, etc. At a high level, a source type definition comprises one or more attributes that define how various components of a data intake and query system collect, index, store, search and otherwise interact with particular types of data consumed by the system.

According to an embodiment, a data intake and query system provides one or more user interfaces that enable users to create, modify, and delete source type definitions. For example, a user may desire to create or modify one or more source type definitions to customize how the system interacts with certain types of data of interest to the user (e.g., particular types of log files or other data the user desires to analyze). User interfaces for creating and modifying source type definitions generally may include one or more interface components that enable users to specify values or rules corresponding to various attributes of a source type definition. In general, one or more components of a data intake and query system may generate the user interfaces, respond to user input, and create and store source type definitions in one or more configuration files locally stored on a system component.

As indicated above, a source type definition may be referenced at many different data processing stages (e.g., data collection, indexing, and searching) and by various different components of a data intake and query system. Accordingly, in one embodiment, a data intake and query system is configured to synchronize source type definitions across multiple components of such a system so that source type configurations made on one system component (e.g., a component that indexes the data) are accessible to other system components (e.g., other components that collect the data or perform searches on the data). By synchronizing a source type definition across multiple components of a data intake and query system, input data received by the system for analysis may be processed consistently across different processing stages.

Other embodiments include, without limitation, a non-transitory computer-readable medium that includes processor-executable instructions that enable a processing unit to implement one or more aspects of the disclosed methods as well as a system configured to implement one or more aspects of the disclosed methods.

2.0. Operating Environment 2.1. System Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. In general, machine-generated data can include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to keep it.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may, for example, enable an analyst to investigate different aspects of the machine data that previously were unavailable for analysis.

However, analyzing and searching massive quantities of machine data presents a number of challenges. For example, a data center may generate many different types of machine data (e.g., system logs, network packet data, sensor data, etc.) from thousands of different components, which can collectively can be very time-consuming to analyze. Also, the unstructured nature of much of this machine data can pose additional challenges because of the difficulty of applying semantic meaning to unstructured data, and the difficulty of indexing and querying unstructured data using traditional database systems.

These challenges can be addressed by using an event-based data intake and query system, such as the SPLUNK® ENTERPRISE system produced by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing unstructured data, which is commonly found in system log files, network data, and other data input sources. Although many of the techniques described herein are explained with reference to a data intake and query system similar to the SPLUNK® ENTERPRISE system, the techniques are also applicable to other types of data systems.

In the SPLUNK® ENTERPRISE system, machine-generated data is collected and stored as "events," where each event comprises a portion of the machine-generated data and is associated with a specific point in time. For example, events may be derived from "time series data," where the time series data comprises a sequence of data points (e.g., performance measurements from a computer system) that are associated with successive points in time. In general, each event can be associated with a timestamp that is derived from the raw data in the event, determined through interpolation between temporally proximate events having known timestamps, determined based on other configurable rules for assigning timestamps to events, etc.

Events can be derived from either "structured" or "unstructured" machine data. In general, structured data has a predefined format, where data items with specific data formats are stored at predefined locations in the data. For example, structured data may include data stored as fields in a database table. In contrast, unstructured data may not have a predefined format. This means that unstructured data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, etc. The data generated by such data sources can include, for example and without limitation, server log files, activity log files, configuration files, messages, network packet data, performance measurements, sensor measurements, etc.

The SPLUNK® ENTERPRISE system also facilitates using a flexible schema to specify how to extract information from the event data, where the flexible schema may be developed and redefined as needed. Note that a flexible schema may be applied to event data "on the fly," when it is needed (e.g., at search time, etc.), rather than at ingestion time of the data as in traditional database systems. Because the schema is not applied to event data until it is needed (e.g., at search time, etc.), it may be referred to as a "late-binding schema."

During operation, the SPLUNK® ENTERPRISE system starts with raw input data (e.g., one or more log files, a stream of network data, etc.). The system divides this raw data into blocks, and parses the data to produce timestamped events. The system stores the timestamped events in a data store, and enables users to run queries against the stored data to retrieve events that meet criteria specified in a query, such as containing certain keywords or having specific values in defined fields. In this context, the term "field" refers to a location in the event data containing a value for a specific data item.

As noted above, the SPLUNK® ENTERPRISE system facilitates applying a late-binding schema to event data while performing queries on events. One aspect of a late-binding schema is "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule." In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or modifying the field extraction rules for use the next time the schema is used by the system. Because the SPLUNK® ENTERPRISE system maintains the underlying raw data and uses late-binding schemas for searching the raw data, it enables an analyst to investigate questions that arise as the analyst learns more about the events.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

2.2. Data Server System

FIG. 1 depicts a block diagram of an example data intake and query system 100, similar to the SPLUNK® ENTERPRISE system. System 100 includes one or more forwarders 104 that consume data from a variety of input data sources 102, and one or more indexers 106 that process and store the data in one or more data stores 108. These forwarders and indexers can comprise separate computer systems, or may alternatively comprise separate processes executing on one or more computer systems.

During operation, the forwarders 104 identify which indexers 106 receive data collected from a data source 102 and forward the data to the appropriate indexers. Forwarders 104 can also perform operations on the data before forwarding, including removing extraneous data, detecting timestamps in the data, performing other data transformations (e.g., parsing data, etc.), etc.

In general, distributing data across different indexers facilitates parallel processing and fault tolerance. This parallel processing can take place at data ingestion time because multiple indexers can process the incoming data in parallel. The parallel processing can also take place at search time because multiple indexers can perform searches on the data in parallel.

System 100 and the processes described below with reference to FIG. 1, FIG. 2, FIG. 3, FIG. 4, and FIG. 5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sokin, and Steve Zhang, SLAML, 2010, each of which is hereby incorporated herein by reference in its entirety for all purposes.

2.3. Source Types Overview

In general, a data intake and query system such as system 100 may include a large number of configurable aspects that enable an administrator or other user to customize the system for particular types of data to be analyzed and to accommodate other user preferences. Configuration data corresponding to some or all of these aspects may be stored in one or more configuration files or other storage mechanisms that are accessible to various components of the system 100. Such configuration data may collectively define how a system 100 collects and processes certain types of data, indexes data, performs searches on stored data, performs data backups, and performs many other features of the system 100.

In an embodiment, one configurable aspect of a system 100 is referred to herein as "source types." In this context, a source type refers to a particular type and format of input data that can be consumed by a system 100 for analysis. As one example, one source type may correspond to a particular type of log data generated by a web server and in which diagnostic and other information related to the operation of the web server is formatted and stored in a particular manner. Other source types may correspond to other types of data, each of which may generated by different devices or applications and formatted according to any number of different formats.

In general, each source type of a system 100 may or may not be unique to a particular type of device or application. For example, two or more different types of applications or devices may produce log files that conform to the same format and thus may correspond to the same source type. Each of the applications may, for example, incorporate the same logging tool that produces a similarly formatted log file in different contexts. Similarly, a single application or device may generate two or more different types of data corresponding to two or more different source types. For example, a single application may generate separate log files conforming to different formats, or may generate both log files and network data.

In an embodiment, configuration data related to source types of a system 100 includes one or more source type "definitions." In general, each source type definition relates to one or more source types and includes one or more properties that define how various components of a system 100 handle input data and events associated with that source type. For example, one source type definition may correspond to log data generated by a particular type of web server and include one or more properties that define how system 100 interacts with the log data. Another source type definition, for example, may include different properties defining how system 100 processes output generated by one or more types of network devices.

In an embodiment, the properties of a source type definition generally comprise a collection of attribute-value pairs. Each attribute may relate to a different aspect of how system 100 interacts with data of a particular source type. A value associated with a particular attribute may specify one or more definitions, rules, or other values related to the corresponding attribute. The attribute-value pairs comprising a source type definition may indicate, among other information, how a system 100 segments input data associated with a particular source type into events, locates or otherwise defines timestamps to be associated with each generated event, and extraction rules for defining fields within the resulting events.

In an embodiment, a data intake and query system 100 may include a number of pre-defined source type definitions corresponding to various types of input data that commonly may be analyzed. For example, a provider of the data intake and query system 100 may pre-define one or more source type definitions corresponding to common types of operating system logs, router logs, and other data generated by widely used applications and devices. According to various embodiments described herein, a data intake and query system 100 may further enable users to create, modify, and delete source type definitions to customize a system 100 for virtually any type of input data a user may desire to analyze.

In one embodiment, each source type definition may be associated with a label or other identifier that is used to identify the definition throughout a system 100. For example, this label may be stored in a metadata field or otherwise associated with each event created from data received from an input source. Based on the label accompanying each event, various components of the system 100 can locate a corresponding source type definition in configuration data accessible to the components when interacting with particular events.

In one embodiment, each source type definition may be stored in one or more configuration files. For example, a label and one or more attribute-value pairs associated with a source type definition may be stored in one or more text files, database tables, or other storage mechanism. Each source type definition may comprise data stored across one or more separate configuration files, and each configuration file may include data related to one or more separate source type definitions. One or more copies of these configuration files may exist across various components of a data intake and query system 100. Referring to FIG. 1, for example, one or more forwarders 104, indexers 106, and search heads 110 may each store local copies of one or more of these configuration files. In other embodiments, one or more components of a system 100 may refer to a shared copy of one or more configuration files.

The following lines represent a portion of an example configuration file including one or more source type definitions:

[default]
CHARSET=AUTO
DATETIME_CONFIG=\etc\datetime.xml
MAX_DAYS_HENCE=2
MAX_DAYS_AGO=2000
MAX_DIFF_SECS_AGO=3600
MAX_DIFF_SECS_HENCE=604800
MAX_TIMESTAMP_LOOKAHEAD=128
MAX_EVENTS=256
LEARN_SOURCETYPE=true In the example above, the first line provides a label for the source type definition. In this example, the label provided is "default," indicating that this source type definition represents default properties which may, for example, apply across all input data unless overridden by one or more source type-specific definitions.

The lines following the source type definition label in the example above illustrate several example attribute-value pairs. In the example, each attribute-value pair includes an attribute name and a value separate by an "=" character. Some of the attribute-value pairs may relate to how components of a data intake and query system parse input data. For example, a value of "AUTO" specified for the CHAR- SET attribute may indicate that the system is to auto-detect a type of encoding associated with input data. As another example, the value specified for the MAX_EVENTS attribute may specify a maximum number of input lines to add to any particular event.

Other attribute-value pairs may relate to how timestamps are generated for each event. The value associated with the DATETIME_CONFIG attribute may, for example, provide a reference to a file that configures a timestamp extractor. As another example, the values associated with the MAX_DAYS_HENCE, MAX_DAYS_AGO, MAX_DIFF_SECS_AGO, MAX_DIFF_SECS_HENCE, and MAX_TIMESTAMP_LOOKAHEAD attributes may determine how date information included in input data is interpreted to generate timestamps for events.

The following lines represent another example portion of a configuration file illustrating a source type-specific definition:

[log 4j]
BREAK_ONLY_BEFORE=\d\d?:\d\d:\d\d
category=Application
description=Output produced by any Java 2 Enterprise Edition (J2EE) application server using log 4j As indicated by the value for the description attribute, the example source type configuration above may relate to output produced by a Java 2 Enterprise Edition (J2EE) application server using log 4j, a popular framework for generating log statements. The first line provides a label of "log 4j" for the source type definition. The second line includes an attribute name "BREAK_ONLY_BEFORE" and a regular expression value which may, for example, indicate that the system 100 is to create a separate event when it encounters a new line in input data that matches the regular expression. The category attribute may, for example, provide a value used to describe the category of source type for use in various interfaces of the system. The example source type definition excerpts illustrated above are provided for illustrative purposes only. In general, source type definitions may be formatted in any manner.

2.4. Data Ingestion

Figure 2:
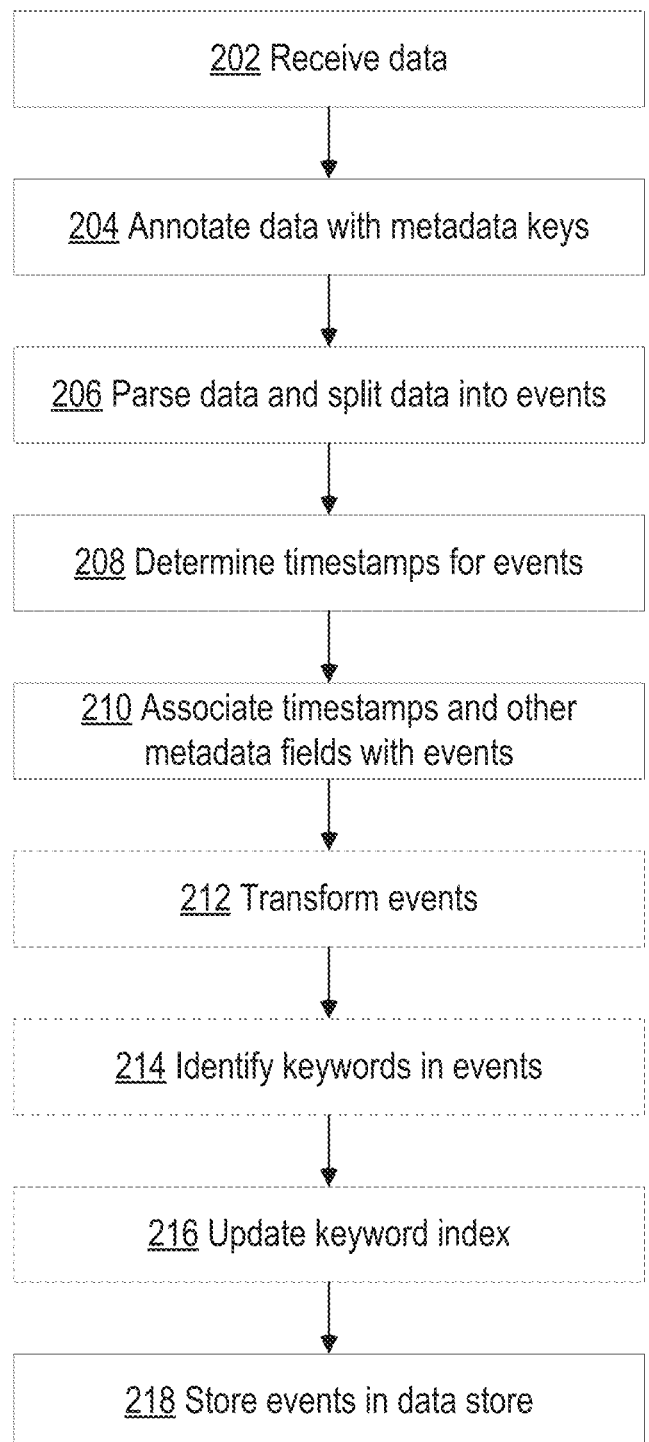
FIG. 2 is a flow diagram that illustrates how indexers process, index, and store data received from forwarders in accordance with the disclosed embodiments.

FIG. 2 depicts a flow chart illustrating an example data flow within a data intake and query system 100, in accordance with the disclosed embodiments. The data flow illustrated in FIG. 2 is provided for illustrative purposes only; one or more of the steps of the processes illustrated in FIG. 2 may be removed or the ordering of the steps may be changed. Furthermore, for the purposes of illustrating a clear example, one or more particular system components is described as performing various operations during each of the data flow stages. For example, a forwarder is described as receiving and processing data during an input phase, an indexer is described as parsing and indexing data during parsing and indexing phases, and a search head is described as performing a search query during a search phase. However, it is noted that other system arrangements and distributions of the processing steps across system components may be used.

2.4.1. Input

At block 202, a forwarder receives data from an input source. A forwarder, for example, initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks," possibly of a uniform data size, to facilitate subsequent processing steps.

At block 204, a forwarder or other system component annotates each block generated from the raw data with one or more metadata fields. These metadata fields may, for example, provide information related to the data block as a whole and which apply to each event that is subsequently derived from the data block, as described in more detail below. For example, the metadata fields may include separate fields specifying each of a host, a source, and a source type related to the data block. A host field, for example, may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data if known, and possibly other values that provide information relevant to later processing steps. In an embodiment, a forwarder forwards the data to another system component for further processing, typically forwarding the annotated data blocks to an indexer.

2.4.2. Parsing

At block 206, an indexer receives data blocks from a forwarder and parses the data to organize the data into events. In an embodiment, to organize the data into events, an indexer may determine a source type associated with each data block (e.g., by extracting a source type label from the metadata fields associated with the data block) and refer to a source type configuration corresponding to the identified source type. The source type definition may include one or more properties that indicate to the indexer what are the boundaries of events in the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, or line breaks. If a source type for the data is unknown to the indexer, an indexer may infer a source type for the data by examining the structure of the data and apply an inferred source type definition to the data to create the events.

At block 208, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, or based on any other rules for determining timestamps.

At block 210, the indexer associates with each event one or more metadata fields including a field containing the timestamp determined for the event. These metadata fields may include a number of "default fields" that are associated with all events, and may also include one more custom fields as defined by a user. Similar to the metadata fields associated with the data blocks at block 204, the default metadata fields associated with each event may include a host, source, and source type field in addition to a field storing the timestamp.

At block 212, an indexer may optionally apply one or more transformations to data included in the events created at block 206. For example, such transformations can include removing a portion of an event (e.g., a portion used to define event boundaries, other extraneous text, etc.), masking a portion of an event (e.g., masking a credit card number), or removing redundant portions of an event. The transformations applied to event data may, for example, be specified in one or more configuration files and referenced by one or more source type definitions.

2.4.3. Indexing

At blocks 214 and 216, an indexer can optionally generate a keyword index to facilitate fast keyword searching for event data. To build a keyword index, at block 214, the indexer identifies a set of keywords in each event. At block 216, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 218, the indexer stores the events in a data store, where a timestamp can be stored with each event to facilitate searching for events based on a time range. In one embodiment, the stored events are organized into "buckets," where each bucket stores events associated with a specific time range based on the timestamps associated with each event. This may not only improve time-based searching, but also allow for events with recent timestamps, which may have a higher likelihood of being accessed, to be stored in faster memory to facilitate faster retrieval. For example, buckets containing the most recent events can be stored as flash memory instead of on hard disk.

Each indexer 106 may be responsible for storing and searching a subset of the events contained in a corresponding data store 108. By distributing events among the indexers and data stores, the indexers can analyze events for a query in parallel, for example, using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812, filed on 30 Apr. 2014, and in U.S. patent application Ser. No. 14/266,817, also filed on 30 Apr. 2014, each of which is hereby incorporated by reference in its entirety for all purposes.

2.5. Query Processing

Figure 3:
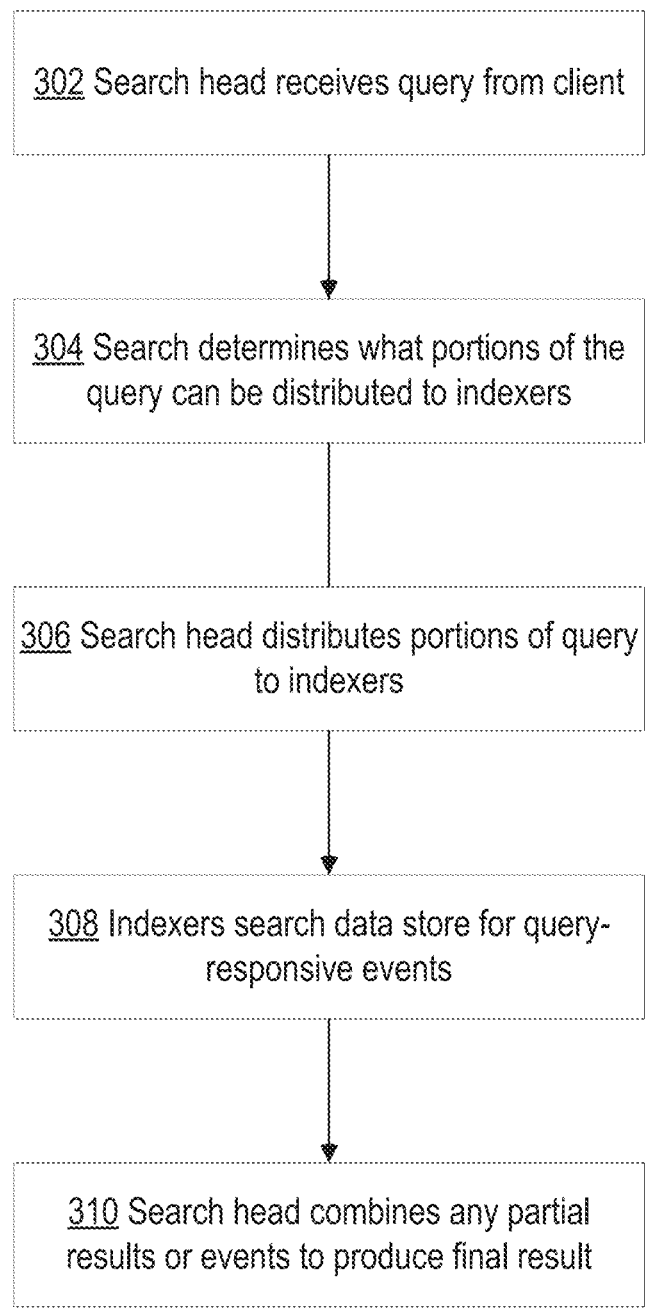
FIG. 3 is a flow diagram that illustrates how a search head and indexers perform a search query in accordance with the disclosed embodiments.

FIG. 3 is a flow diagram that illustrates an example process that a search head and one or more indexers may perform during a search query. At block 302, a search head receives a search query from a client. At block 304, the search head analyzes the search query to determine what portions can be delegated to indexers and what portions can be executed locally by the search head. At block 306, the search head distributes the determined portions of the query to the appropriate indexers.

At block 308, the indexers to which the query was distributed search their data stores for events that are responsive to the query. To determine which events are responsive to the query, the indexer searches for events that match the criteria specified in the query. This criteria can include matching keywords or specific values for certain fields. In searches that use a late-binding schema, the searching operations at block 308 may involve using the late-binding schema to extract values for specified fields from events at the time the query is processed. In an embodiment, one or more rules for extracting field values may be specified as part of a source type definition. The indexers may then either send the relevant events back to the search head, or use the events to calculate a partial result, and send the partial result back to the search head.

At block 310, the search head combines the partial results and/or events received from the indexers to produce a result for the query. This result may comprise different types of data depending on what the query requested. For example, the results can include a listing of matching events returned by the query, or some type of visualization of the data from the returned events. In another example, the final result can include one or more calculated values derived from the matching events.

The results generated by the system 100 can be returned to a client using different techniques. For example, one technique streams results back to a client in real-time as they are identified. Another technique waits to report the results to the client until a complete set of results is ready to return to the client. Yet another technique streams interim results back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results.

2.6. Field Extraction

Figure 4:
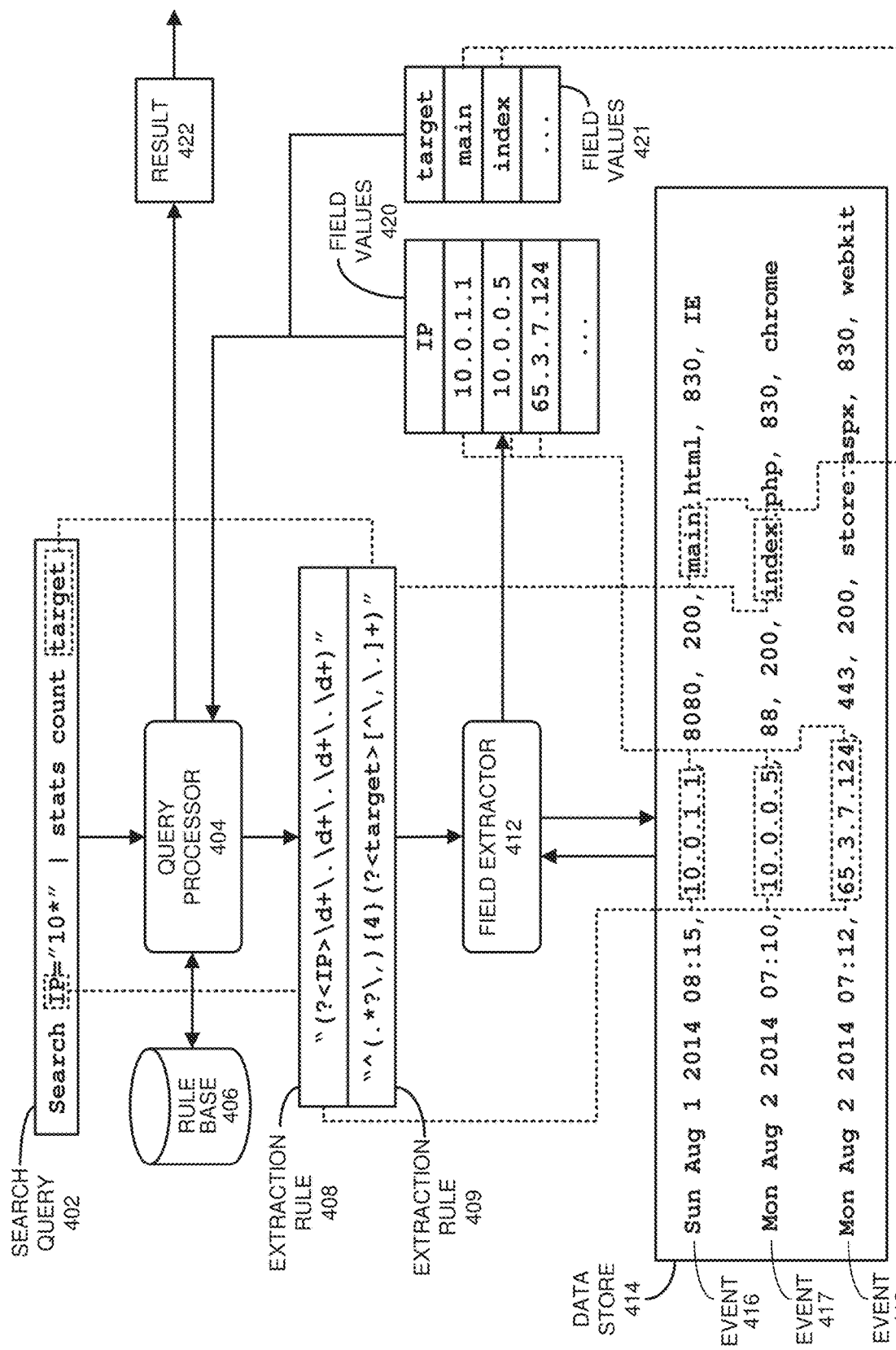
FIG. 4 illustrates a block diagram of a system for processing search requests that uses extraction rules for field values in accordance with the disclosed embodiments.

FIG. 4 illustrates an example of applying extraction rules to a search query received from a client. At the start of the process, a search query 402 is received at a query processor 404. Query processor 404 includes various mechanisms for processing a query and may reside in a search head 110 and/or an indexer 106. Note that the example search query 402 illustrated in FIG. 4 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any other query language.

In response to receiving search query 402, query processor 404 determines that search query 402 refers to two fields:

"IP" and "target." Query processor 404 also determines that the values for the "IP" and "target" fields have not already been extracted from events stored in a data store 414, and consequently determines that query processor 404 can use extraction rules to extract values for the fields. Hence, query processor 404 performs a lookup for the extraction rules in a rule base 406. For example, rule base 406 may include a source type definition, where the source type definition includes extraction rules for various different source types. The query processor 404 obtains extraction rules 408-409, wherein extraction rule 408 specifies how to extract a value for the "IP" field from an event, and extraction rule 409 specifies how to extract a value for the "target" field from an event. As is illustrated in FIG. 4, extraction rules 408-409 can comprise regular expressions that specify how to extract values for the relevant fields. Such regular expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-417 illustrated in FIG. 4. Moreover, the query processor 414 can instruct field extractor 412 to apply the extraction rules to all the events in a data store 414, or to a subset of the events that have been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digitals, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command includes events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.7. Example Search Screen

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.8. Acceleration Technique

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

2.8.1. Map-Reduce Technique

Figure 5:
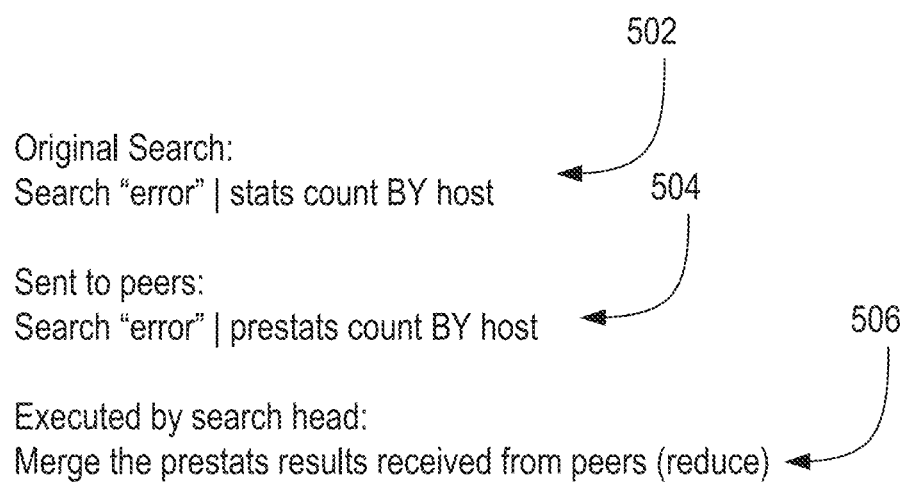
FIG. 5 illustrates an example search query received from a client and executed by search peers in accordance with the disclosed embodiments.

To facilitate faster query processing, a query can be structured as a map-reduce computation, wherein the "map" operations are delegated to the indexers, while the corresponding "reduce" operations are performed locally at the search head. For example, FIG. 5 illustrates how a search query 502 received from a client at a search head 110 can split into two phases, including: (1) a "map phase" comprising subtasks 504 (e.g., data retrieval or simple filtering) that may be performed in parallel and are "mapped" to indexers 106 for execution, and (2) a "reduce phase" comprising a merging operation 506 to be executed by the search head when the results are ultimately collected from the indexers.

During operation, upon receiving search query 502, a search head 110 modifies search query 502 by substituting "stats" with "prestats" to produce search query 504, and then distributes search query 504 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 506 on the results. Note that by executing the computation in this way, the system effectively distributes the computational operations while minimizing data transfers.

2.8.2. Keyword Index

As described above with reference to the flow charts in FIG. 2 and FIG. 3, data intake and query system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.8.3. High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

2.8.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucketby-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on 19 Nov. 2013, and U.S. Pat. No. 8,412,696, issued on 2 Apr. 2011.

2.9. Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 7A:
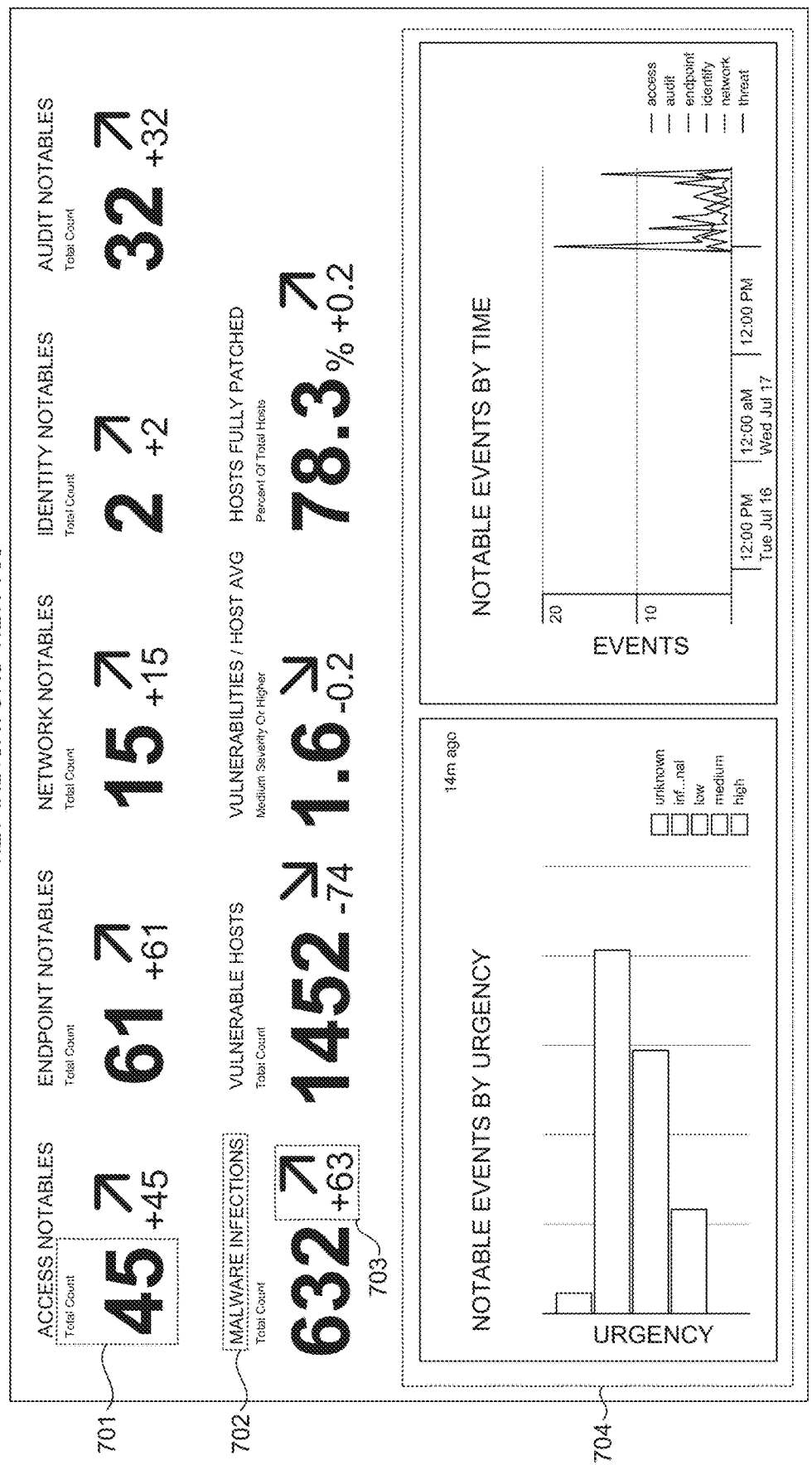
FIG. 7A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 7A illustrates an example key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 704 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 7B:
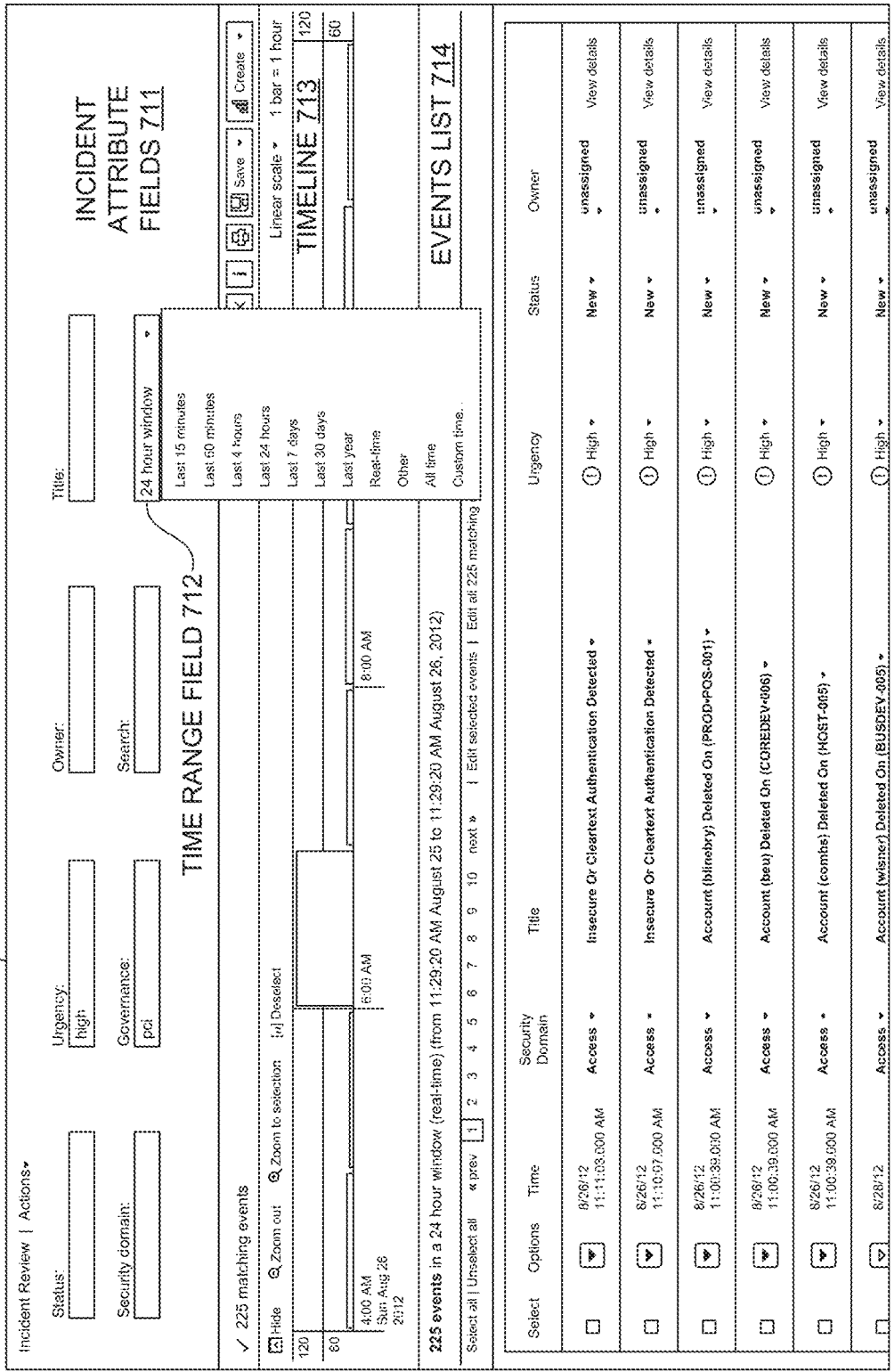
FIG. 7B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 7B illustrates an example incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of all of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

2.10. Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167, 316 filed 29 Jan. 2014, which is hereby incorporated herein by reference. Also, see "vSphere Monitoring and Performance," Update 1, vSphere 5.5, EN-001357-00, http:// pubs.vmware.com/vsphere-55/topic/com.vmware.ICbase/ PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 7C:
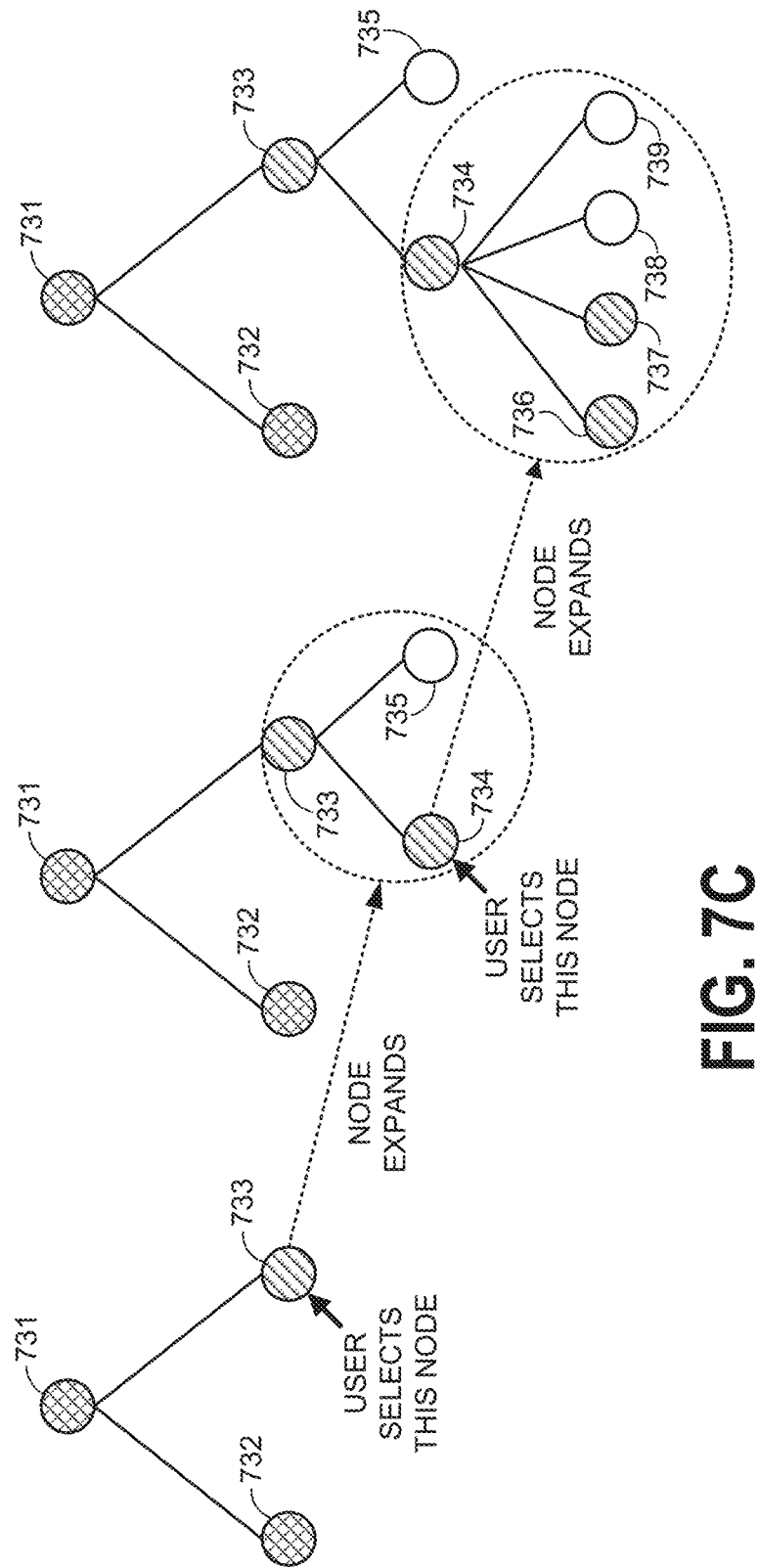
FIG. 7C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 7C, wherein nodes 733 and 734 are selectively expanded. Note that nodes 731-739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 7D:
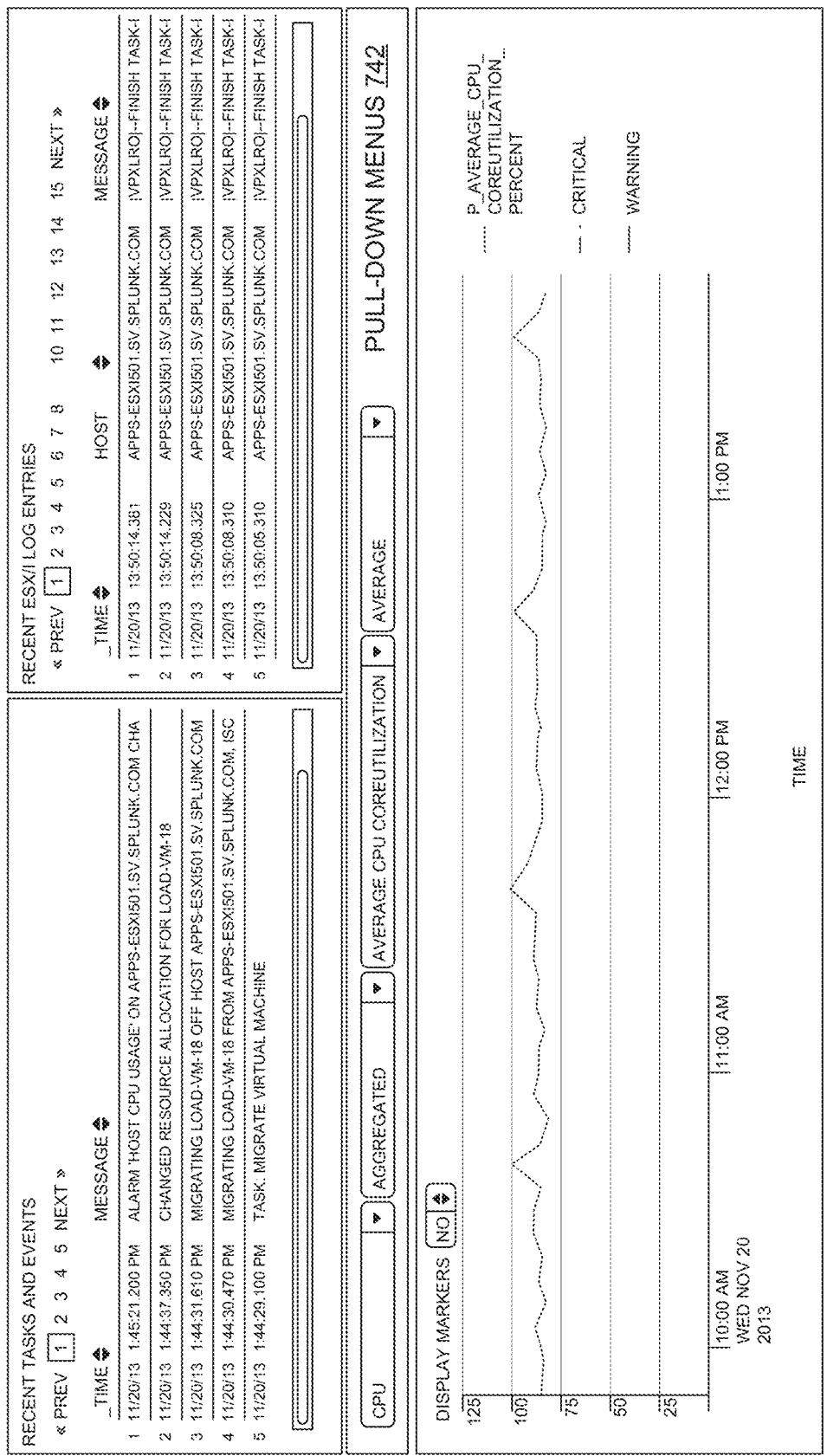
FIG. 7D illustrates a screen displaying both log data and performance data in accordance with the disclosed embodiments.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 7D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

2.11. Cloud-Based System Overview

The example data intake and query system 100 described in reference to FIG. 1 comprises several system components, including one or more forwarders, indexers, and search heads. In some environments, a user of a data intake and query system 100 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution, meaning the system 100 is installed and operates on computing devices directly controlled by the user of the system. Some users may prefer an on-premises solution since it may provide a greater level of control over the configuration of certain aspects of the system. However, other users may instead prefer an arrangement in which the user is not directly responsible for providing and managing the computing devices upon which various components of system 100 operate.

In one embodiment, to provide an alternative to an entirely on-premises environment for system 100, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and providing access to the system to end users via a network. Typically, a user may pay a subscription or other fee to use such a service, and each subscribing user to the cloud-based service may be provided with an account that enables the user to configure a customized cloud-based system based on the user's preferences.

Figure 8:
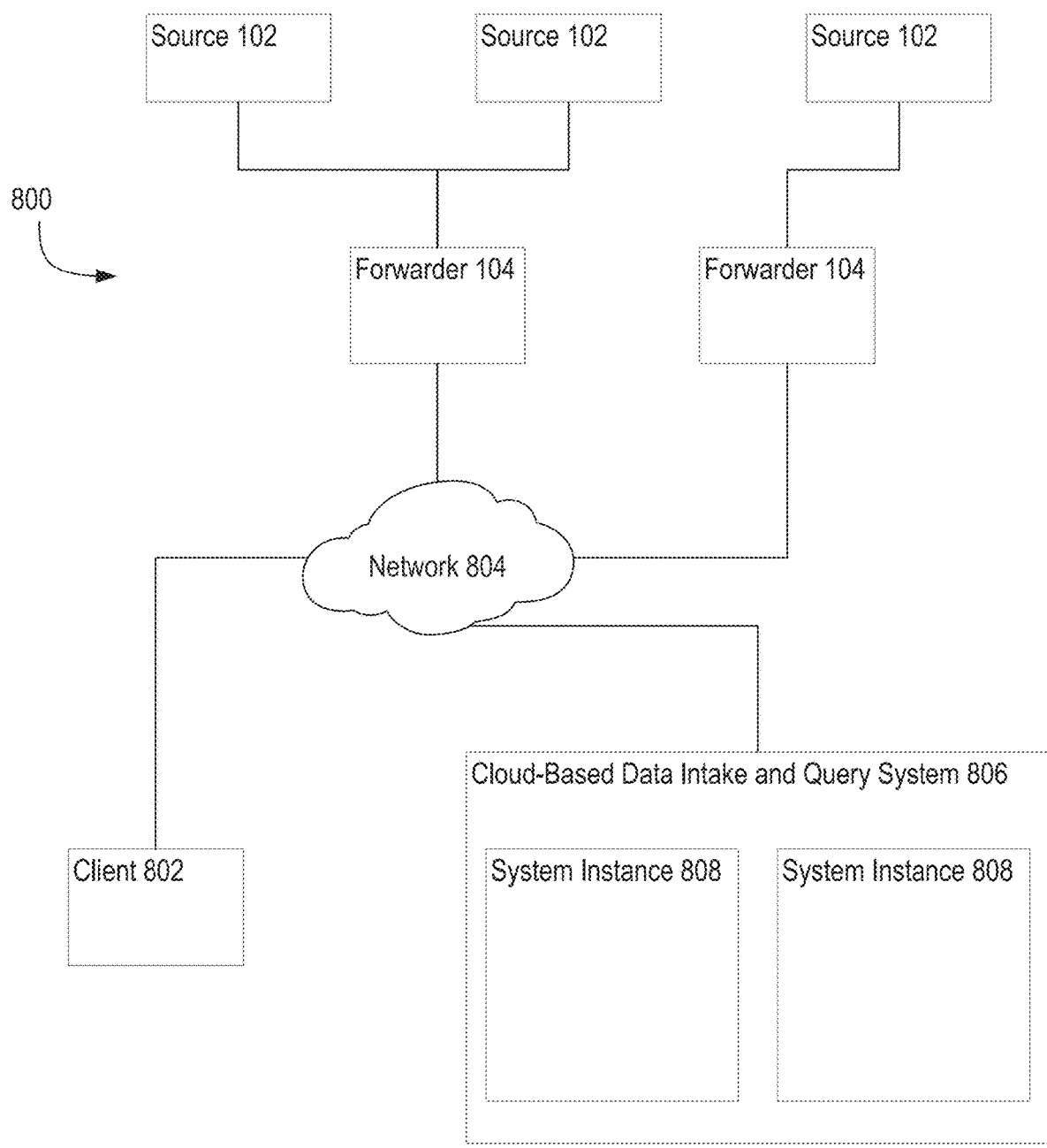
FIG. 8 illustrates a block diagram of an example cloud-based data intake and query system in which an embodiment may be implemented.

FIG. 8 illustrates a block diagram of an example cloud-based data intake and query system. Similar to the system of FIG. 1, the networked computer system 800 includes input data sources 102 and forwarders 104. In the example system 800 of FIG. 8, one or more forwarders 104 and client devices 802 are coupled to a cloud-based data intake and query system 806 via one or more networks 804. Network 804 broadly represents one or more LANs, WANs, cellular networks, and/or internetworks using any of wired, wireless, terrestrial microwave, satellite links, etc., and may include the public Internet, and is used by client devices 802 and forwarders 104 to access the system 800. Similar to the system of 100, each of the forwarders 104 may be configured to receive data from an input source and to forward the data to other components of the system 806 for further processing.

In an embodiment, a cloud-based data intake and query system 806 may comprise a plurality of system instances 808. In general, each system instance 808 may include one or more computing resources managed by a provider of the cloud-based system 800 made available to a particular subscriber. The computing resources comprising a system instance 808 may, for example, include one or more servers or other devices configured to implement one or more forwarders, indexers, search heads, and other components of a data intake and query system, similar to system 100. As indicated above, a subscriber may use a web browser or other application of a client device 802 to access a web portal or other interface that enables the subscriber to configure an instance 808.

Providing a data intake and query system as described in reference to system 100 as a cloud-based service presents a number of challenges. As described in reference to the data flow illustrated in FIG. 2, for example, each of the components of a system 100 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 808). Thus may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof.

3.0. Source Type Management

As indicated above, source type definitions may relate to several aspects of how a data intake and query system collects, indexes, stores, and performs searches on data in both on-premises and cloud-based service environments. Thus, the ability for users to create and customize source type definitions can greatly facilitate the ability for users to load virtually any type of data into a data intake and query system for analysis.

Furthermore, the use of source type definitions by a data intake and query system to interact with data consumed by the system may occur across multiple system components. For example, one or more properties of a source type definition may be referenced by an indexer during parsing and indexing of data received. One or more other properties of the source type definition may be referenced by a search head during processing of a search query. Thus, to ensure that data of a particular source type is handled consistently at different processing phases within the system, multiple system components may access the same source type definition and any updates to a source type definition.

According to various embodiments described herein, a data intake and query system provides one or more graphical user interfaces that enable users to create, modify, and delete source type configurations. Furthermore, techniques are described for generating or modifying one or more configuration files based on input received via the one or more graphical user interfaces, and synchronizing these configuration files across various system components of the data intake and query system. The ability for users to configure source type definitions using intuitive graphical user interfaces may, among other benefits, alleviate administrators of a data intake and query system from many otherwise manual and time-consuming maintenance steps.

Furthermore, by enabling synchronization of source type definitions across components of a data intake and query system, end users may be alleviated from understanding some of the more complex aspects of the system as it relates to source types (e.g., understanding what an indexer does separately from a search head, understanding the roles of a cluster master and a deployment server, etc.). This abstraction of the system for end users may be beneficial both to users without direct access to the individual computing resources implementing one or more of the system components and those who may not desire to undertake learning how the individual system components operate separately from the system as a whole.

3.1. Configuring Source Types

Figure 9:
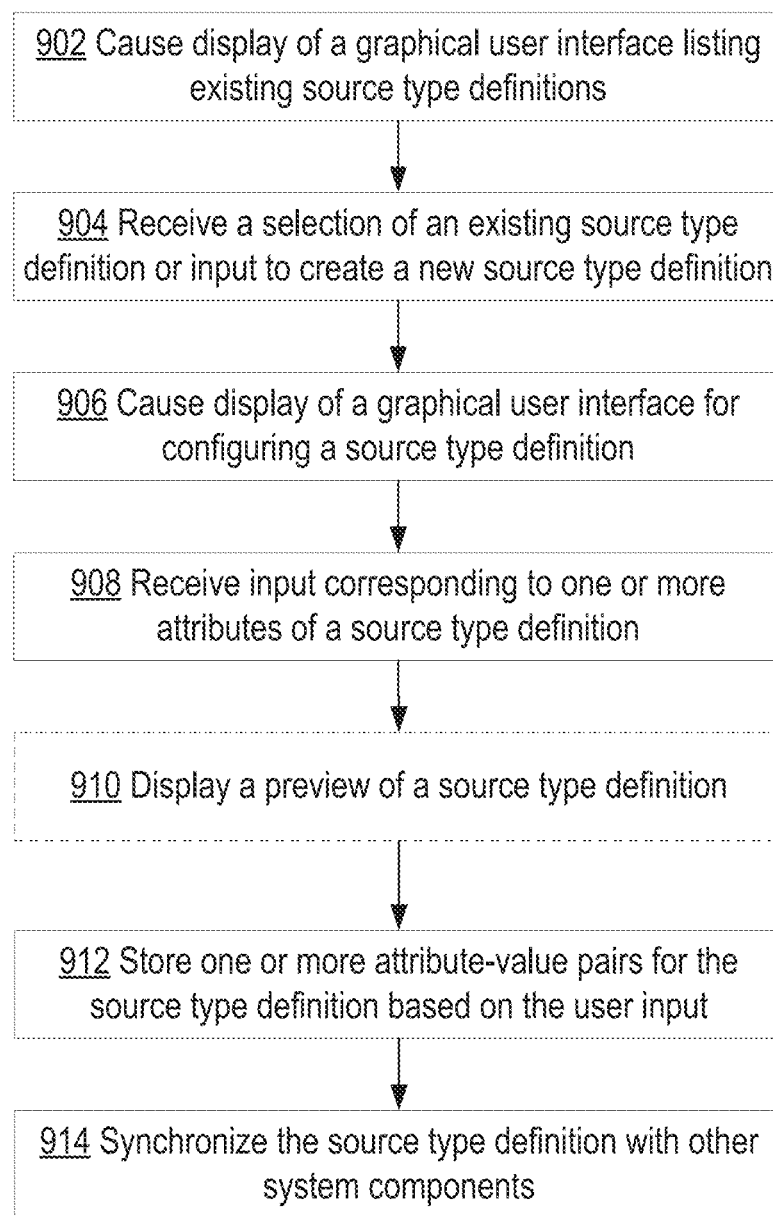
FIG. 9 is a flow diagram that illustrates an example process for providing interfaces enabling configuration of source type definitions and synchronizing source type definitions across multiple system components, according to one or more aspects of the present disclosure.

FIG. 9 is a flow diagram illustrating an example process for providing graphical user interfaces for configuring source types, storing a source type definition in one or more configuration files based on user input, and synchronizing source type definitions across various components of a data intake and query system. The various elements of flow 900 may be performed in a variety of systems, including systems such as system 100 and system 800 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

At block 902, a system component causes display of a graphical user interface comprising a list of source type definitions which currently exist in the system. For example, one or more components of a system 100 (e.g., a forwarder, indexer, or search head) or a system 800 may comprise a web server configured to provide browser-based interfaces that generally enable users to interact with the system. A user may, for example, navigate a web browser to a particular URL to access the system interfaces. In another embodiment, other interfaces may be used such as a standalone application executing on a system component or client device that interfaces with the system component. In general, one or more of the graphical user interfaces may comprise interfaces for configuring one or more aspects of the system 100. For example, the interfaces may provide interface components that enable a user to configure system level settings, settings related to data input sources, settings related report generation, etc.

In one embodiment, one or more of the graphical user interfaces generated by a system component include interfaces for configuring source type definitions. For example, a user may use a web browser or other application to select a link from a system menu to configure source type definitions. In response to receiving the user selection, a component of the system may cause display of one or more graphical user interfaces that includes a list of existing source type definitions and further enable a user to select particular source type definitions for modification or deletion, or to select other interface components to create a new source type definition.

Figure 10:
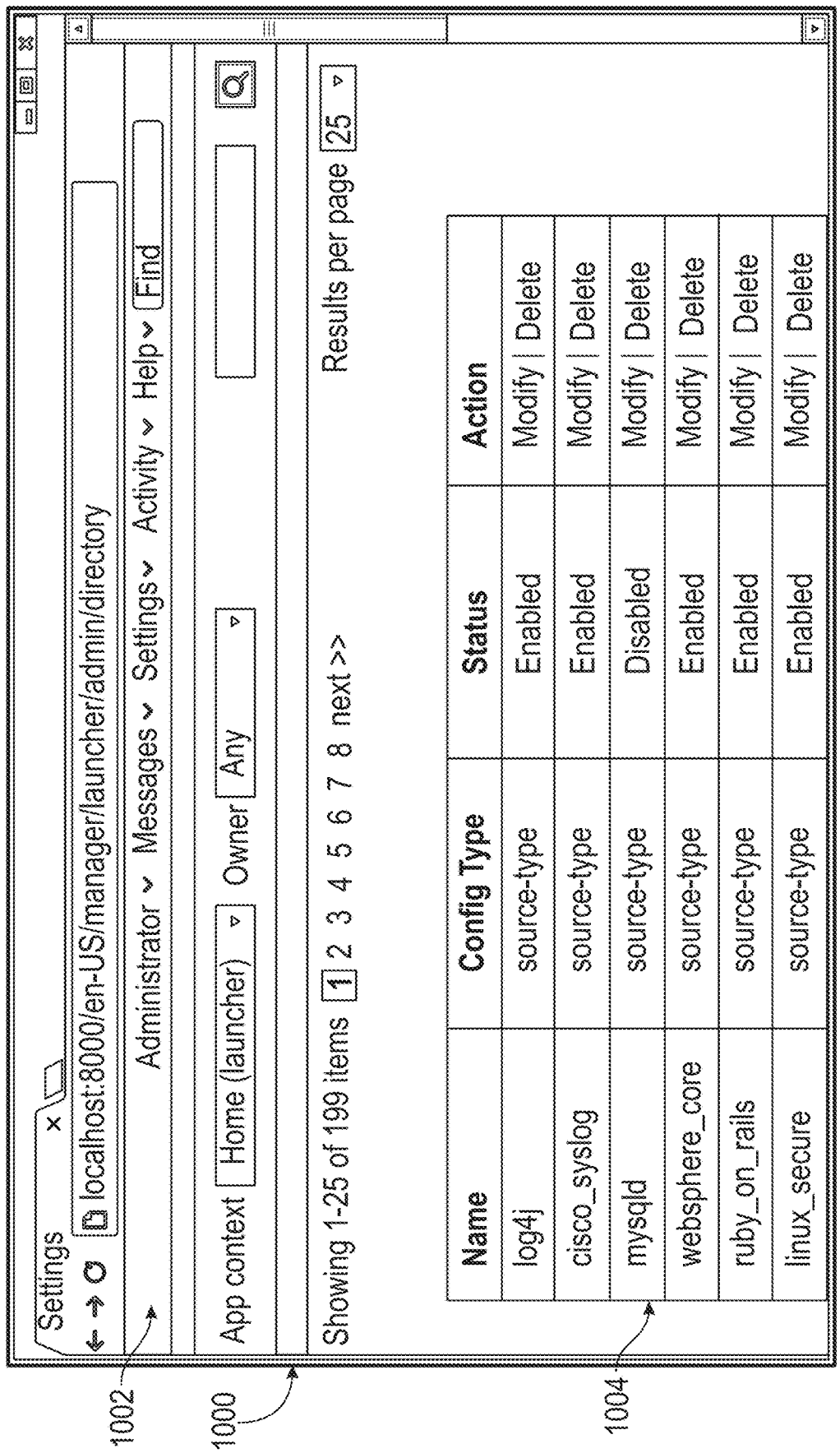
FIG. 10 depicts an example graphical user interface displaying a list of existing source type definitions of a data intake and query system.

FIG. 10 depicts an example graphical user interface which lists existing source type definitions of a data intake and query system. Interface 1000, for example, comprises a menu bar 1002, and a table 1004 which lists a number of existing source type definitions. Menu bar 1002 includes menu options that enable a user to navigate to various interface screens provided by the system. For example, using menu bar 1002, a user may navigate to interfaces for configuring various aspects of the system, to perform searches on data stored in the system, or to interact with the system in other ways. Interface 1000, for example, may have been generated in response to a user selecting an option from the "Settings" menu item in menu bar 1002 corresponding to "Source Types" indicating a desire to configure system source types.

Table 1004 displays several rows listing existing source type definitions including additional fields providing information related to each listed source type definition. For example, the first row in table 1004 corresponds to a source type definition labeled "log 4j," the second row corresponds to a source type definition labeled "cisco_syslog," and so forth. A system component generating interface 1000 may obtain the data displayed in table 1002, for example, by examining one or more configuration files, extracting items of information for each source type definition included in the configuration files, and generating a table listing the extracted information items. Each row of table 1004 may include one or more hyperlinks that link to a separate graphical user interface for configuring particular source type definitions. For example, each label in the "Name" column may operate as a hyperlink to a separate interface for configuring the source type definition corresponding to the selected label. A "Status" column may indicate for each of the listed source type definitions whether the definition is currently enabled or disabled for use by the system. An "Action" column may include, for example, one or more hyperlinks or other interface components that link to separate interfaces to modify or delete a particular source type definition. Interface 1000 may further include one or more interface components for creating a new source type definition, or deleting an existing definition.

Referring again to FIG. 9, at block 906, in response to receiving a selection of a particular source type definition, or in response to receiving a selection to create a new source type definition, a system component causes display of a graphical user interface for configuring a source type definition. In an embodiment, a graphical user interface for configuring a source type definition generally may include one or more interface components which enable a user to specify values associated with one or more attributes of a source type definition. For example, one interface component may relate to attributes that define how the system segments data of the corresponding source type into events, another interface component may relate to attributes for how the system generates timestamps for each generated event, and so forth. If the user selected an existing source type definition for modification at block 904, one or more of interface components may be pre-populated with existing configuration information for the selected source type.

FIG. 11 depicts a portion of an example graphical user interface displaying one or more interface components for configuring a source type definition. Region 1102, for example, comprises interface components that enable a user to specify a rule for determining event boundaries in input data associated with the corresponding source type. By selecting one of the buttons in region 1102, for example, a user may indicate for the source type definition under modification that the boundaries of events are to be automatically determined by the system, determined based on each line included in input data, or determined based on a customizable regular expression that defines event boundaries.

Region 1104 comprises interface components that enable a user to specify a rule for determining a timestamp to be associated with each event associated with the source type. For example, a user may select a button in region 1104 to indicate that timestamps are to be automatically generated for each event, based on a time corresponding to when each event is created, or based on other timestamp rules such as a regular expression that identifies where a time value for each event is stored within the events. A "Timestamp format" may enable a user to specify a string representing a time stamp format to use when searching for timestamps within input data.

Region 1106 includes one or more "greenfield" interface components that enable a user to specify values for any attribute-value pair supported by the system. For example, a user may review documentation for the data intake and query system and determine that an attribute named "CHARSET" may be configured to identify a character encoding associated with a source type. As depicted in the example of region 1106, a user may provide input specifying the name of the attribute (e.g., CHARSET in the "Name" field) and further specifying a value of "UTF-8," corresponding to the UTF-8 character encoding. The rows below the first row include other specified attribute-value pairs, including values for a "NO_BINARY_CHECK" and a "disabled" attribute.

Region 1108 comprises one or more interface components that enable a user to specify other delimited settings, including a field delimiter setting, a quote character setting, a file preamble setting, and one or more field name settings. Each of these settings may enable a user to adjust other settings related to how input data of the source type is parsed. For example, a "Field delimiter" setting may enable a user to specify a character that identifies how to separate input data into separate field; a "Quote character" setting may enable a user to specify a character that identifies when particular text within input data is contained within quotes; a "Field preamble" setting may enable a user to provide input specifying a regular expression or other instructions to identify one or more lines at the beginning of input data containing a preamble section that is to be ignored during parsing; a "Field names" setting may enable a user to specify one or more regular expressions or other rules for determining a field name for fields extracted from input data.

Referring again to FIG. 9, at block 908, user input is received by a system component, the input comprising one or values corresponding to various attributes of a source type definition. For example, a user providing the input to one or more graphical user interfaces may select a button (e.g., a "save" button) or other interface component to save the configuration input and, in response, a web browser or other application used by the user to provide the input sends one or more values corresponding to the input to a system component. The input generally may include one or more values corresponding to one or more attributes of the source type definition including, for example, one or more numeric values, text strings, regular expressions, etc. In an embodiment, the input may be received as it is provided by the user and without an express action by the user to save the input.

At block 910, a source type definition under configuration optionally may be previewed. In general, a preview of a source type definition generally may include any display that indicates how one or more attributes of the configured source type definition are applied to input data associated with the source type. For example, the display may include a display that shows a sample of data parsed into a plurality of events based on the specified event boundary rules. The display may also include an indication of a timestamp to be applied to each event, and the contents of one or more fields extracted from each event. By reviewing the contents of the parsed events, timestamps, and other attributes, a user can determine whether the configured source type definition results in a parsing of input data as the user expected. If the user determines that the sample events are not correctly parsed, the user may return to the configuration interface for the source type definition and further modify the definition until a desired result is reached.

FIG. 12 depicts an example graphical user interface which includes a preview displaying sample input data parsed according to one or more attributes of a source type definition. Interface 1200, for example, includes a region 1202 comprising a table listing several example events derived from input data based on a configured source type definition. The left side of interface 1200 depicts collapsed interface component groups for configuring a source type definition, for example, similar to those depicted in FIG. 11. For example, a user may configure a source type definition using one or more of the interface components depicted in FIG. 11, and subsequently a preview of example events derived from input data based on the configured source type definition may be displayed. The preview displayed in region 1202 may be displayed in response to a user selecting an interface component indicating that the user has completed configuring a source type definition, the preview may be displayed in real-time as the user configures the source type definition, etc.

Each of the rows of the table in region 1202, for example, illustrate an individual event parsed from sample input data according to the source type definition under configuration. Region 1202 provides other indications of how a source type definition is being applied, for example, by highlighting portions of each event indicating data from which a timestamp is derived for each event. Other example interfaces may provide other preview information, including an indication of fields parsed from events or transformations applied to data contained within the events.

3.2. Synchronizing Source Type Configurations

In one embodiment, a user may provide input to save a source type definition under configuration. In response to receiving the input to save a configured source type definition, one or more attribute-value pairs and any other configuration information related to the source type definition as configured by the user are saved in one or more configuration files. The configuration files generally may be stored in storage local to the component of the data intake and query system which generated the interfaces used to create or modify the source type definition. For example, if a user accesses an interface generated by an indexer of system 100 to configure a source type definition, the resulting source type definition may be saved in one or more configuration files stored at that indexer. However, source type definitions generally include configuration data that is relevant to more than one component of a data intake and query system (e.g., other indexers, forwarders, search heads, etc.). Thus, in one embodiment, source type definitions are synchronized across multiple system components to ensure that data of a particular source type is consistently processed throughout a data intake and query system.

Referring again to FIG. 9, at block 914, a source type definition created or modified by a user at one system component is synchronized with other system components. In general, synchronizing a source type definition may include sending one or more configuration files containing the newly created or modified source type definition to one or more other system components via a network. Sending the one or more configuration files may include sending the entirety of the files, or only a portion of the configuration files which contain the newly created or modified source type definition may be synchronized. Each of the system components receiving the updated configuration files or portions thereof may store the updated configure files locally to that component for subsequent use.

In one embodiment, a process for synchronizing one or more configuration files containing source type definitions may involve separate synchronization steps for different types of system components. For example, as illustrated in reference FIG. 1 and FIG. 8, a data intake and query system generally may include a number of system components of various types, including one or more forwarders, indexers, and search heads. In one embodiment, synchronizing the one or more configuration files may include sending the one or more configuration files to particular system components that are responsible for managing other system components. These particular system components may in turn synchronize the configuration files with other components of a particular type.

For example, a data intake and query system may include a plurality of indexers, referred to as an indexer cluster, which are managed by a system component referred to as a "master node." In general, a master node manages the operation of an indexer cluster, including maintaining a list of peer indexers currently in operation and managing replication of data across peer indexers. In an embodiment, synchronizing one or more configuration files with an indexer cluster may include sending the configuration files to the master node, which is then configured to synchronize the configuration files across indexers. The master node may, for example, maintain a list of IP addresses or other connection identifiers associated with each indexer in the cluster that enables the master node to send the configuration files to the indexers over a network. Each indexer in the cluster may receive the configuration files from the master node and store the files local to the indexer for subsequent use.

Similarly, synchronizing one or more configuration files may include sending the configuration files to a system component responsible for managing operation of one or more search heads, referred to as a "search cluster master." A search cluster master generally is responsible for managing a cluster of search heads, and may be configured to distribute one or more updated configuration files to each of the search heads for which it is responsible. Techniques for distributing configuration information among search heads are described in U.S. patent application Ser. No. 14/448,919, entitled "CONFIGURATION REPLICATION IN A SEARCH HEAD CLUSTER", filed on 31 Jul. 31 2014, and which is hereby incorporated by reference in its entirety for all purposes.

In one embodiment, synchronization of configuration files with one or more forwarders may comprise sending the configuration files to a system component referred to as a "deployment server." In general, a deployment server may be configured to distribute configurations and content updates to various components of a data intake and query system, including forwarders. In one embodiment, each forwarder 104 may be configured to periodically communicate with a particular deployment server to check for any configuration updates. If the deployment server indicates that one or more configuration files updates are available (e.g., one or more configuration files containing new or modified source type definitions), the deployment server may push to the forwarder or the forwarder may download the configuration file updates from the deployment server. The forwarder may then save the one or more configuration files to local storage.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

Note that, although separate embodiments are discussed herein, any combination of embodiments and/or partial embodiments discussed herein may be combined to form further embodiments.

4.0. Implementation Mechanisms—Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
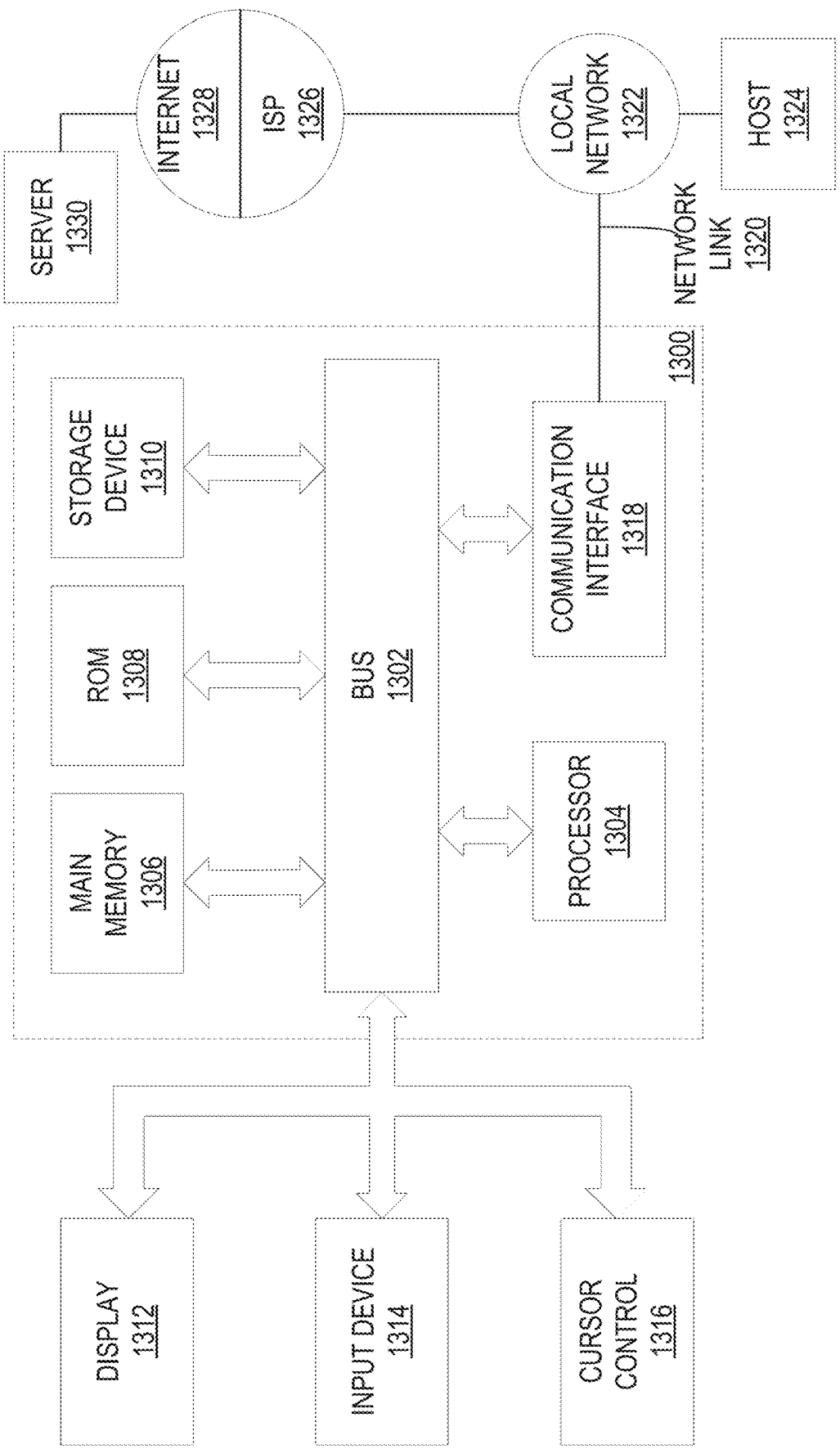
FIG. 13 illustrates a computer system upon which an embodiment may be implemented.

For example, FIG. 13 is a block diagram that illustrates a computer system 1300 upon which an embodiment may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or solid-state drive is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

5.0. Example Embodiments

In an embodiment, a method or non-transitory computer readable medium comprises: causing, by a system component of a data intake and query system comprising a plurality of system components, display of a graphical user interface for configuring a source type definition corresponding to a particular source type, the source type definition including one or more attributes related to parsing input data of the source type to generate one or more events; receiving, via the graphical user interface, user input corresponding to values for the one or more attributes; storing, in one or more configuration files, the one or more values in association with the one or more attributes; causing the one or more configuration files to be stored on at least two system components of the plurality of system components.

In an embodiment, the method or computer readable medium further comprises: subsequent to causing the one or more configuration files to be stored on at least two system components of the plurality of system components, receiving, by a particular system component of the plurality of system components, particular input data associated with the particular source type; generating a plurality of events from the particular input data based on one or more of the one or more values stored in the one or more configuration files.

In an embodiment, the method or non-transitory computer readable medium further comprises: subsequent causing the one or more configuration files to be stored on at least two system components of the plurality of system components, receiving, by a search head, a query for data of the source type; processing, by the search head, the query based on one or more of the one or more values stored in the one or more configuration files.

In an embodiment, the method or non-transitory computer readable medium further comprises: wherein the source type definition further includes one or more attributes related to determining a timestamp for each event of the one or more events.

In an embodiment, the method or non-transitory computer readable medium further comprises: wherein the source type definition further includes one or more attributes related to extracting one or more fields from each event of the one or more events.

In an embodiment, the method or non-transitory computer readable medium further comprises: wherein the one or more one or more values stored in association with the one or more attributes comprises a regular expression.

In an embodiment, the method or non-transitory computer readable medium further comprises: wherein causing the one or more configuration files to be stored on at least two of the two or more system components includes sending the one or more configuration files to one or more of the at least two of the two or more system components.

In an embodiment, the method or non-transitory computer readable medium further comprises: wherein causing the one or more configuration files to be stored on at least two system components of the plurality of system components is performed automatically in response to user providing input to save the source type definition.

In an embodiment, the method or non-transitory computer readable medium further comprises: causing display of a second graphical user interface displaying a list of existing source type definitions; receiving a selection of a particular source type definition from the list of existing source type definitions; wherein the graphical user interface is caused to be displayed in response to receiving the selection of the particular source type definition.

In an embodiment, the method or non-transitory computer readable medium further comprises: causing display of a second graphical user interface displaying a list of existing source type definitions; wherein the second graphical user interface includes one or more interface components to create a new source type definition or to delete an existing source type definition.

In an embodiment, the method or non-transitory computer readable medium further comprises: causing display of a preview displaying particular input data parsed according to one or more particular attributes of the source type definition.

In an embodiment, a method or non-transitory computer readable medium comprises: wherein the plurality of system components includes one or more of an indexer, a forwarder, and a search head.

In an embodiment, a method or non-transitory computer readable medium comprises: wherein the input data is one or more of a file, a directory of files, and a network event.

In an embodiment, a method or non-transitory computer readable medium comprises: wherein causing the one or more configuration files to be stored on at least two of the two or more system components includes sending the one or more configuration files to a master node configured to manage a cluster of indexers.

In an embodiment, a method or non-transitory computer readable medium comprises: wherein causing the one or more configuration files to be stored on at least two of the two or more system components includes sending the one or more configuration files to a search cluster master configured to manage a cluster of search heads.

In an embodiment, a method or non-transitory computer readable medium comprises: wherein causing the one or more configuration files to be stored on at least two of the two or more system components includes sending the one or more configuration files to a deployment server configured to manage one or more forwarders.

In an embodiment, a method or non-transitory computer readable medium comprises: receiving, by a particular system component of the plurality of system components, particular input data associated with the particular source type; based on one or more of the plurality of values stored in the one or more configuration files: generating a plurality of events from the particular input data; and determining a timestamp for each event of the plurality of events.

In an embodiment, a method or non-transitory computer readable medium comprises: causing display of a preview displaying one or more events parsed from particular input data according to one or more particular attributes of the source type definition, and further providing an indication of one or more fields parsed from the one or more events.

6.0. Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction.

In drawings, various system components are depicted as being communicatively coupled to various other components by arrows. These arrows illustrate only certain examples of information flows between the components of the depicted systems. Neither the direction of the arrows nor the lack of arrow lines between certain components should be interpreted as indicating the absence of communication between the certain components. Indeed, each component of the depicted systems may feature an open port, API, or other suitable communication interface by which the component may become communicatively coupled to other components of the depicted systems as needed to accomplish any of the functions of the systems described herein.

The invention claimed is:

1. A method, comprising:
  causing, by a data intake and query system comprising a plurality of system components, display of a graphical user interface for configuring a source type definition corresponding to a particular source type of an information technology environment, the source type definition including a plurality of attribute-value pairs to enable the data intake and query system to generate one or more events from data of the particular source type generated by at least one component in the information technology environment;
  wherein the graphical user interface includes one or more attributes corresponding to one or more attribute-value pairs of the plurality of attribute-value pairs, and a user editable field for entering a value associated with at least one of the one or more attributes;
  receiving, via the graphical user interface, user input corresponding to the value for the at least one of the one or more attributes;
  storing, in one or more configuration files, the value in association with the at least one of the one or more attributes as one of the one or more attribute-value pairs; and
  causing the one or more configuration files to be stored on one or more system components of the plurality of system components.

2. The method of claim 1, further comprising:
  subsequent to causing the one or more configuration files to be stored on one or more system components of the plurality of system components, receiving, by a particular system component of the plurality of system components, particular data of the particular source type; and
  generating a plurality of events from the particular data based on the value stored in the one or more configuration files.

3. The method of claim 1, further comprising:
  subsequent to causing the one or more configuration files to be stored on one or more system components of the plurality of system components, receiving, by a search head, a query for data of the particular source type; and
  processing, by the search head, the query based at least in part on the value stored in the one or more configuration files.

4. The method of claim 1, wherein the source type definition further includes one or more attributes related to determining a timestamp for each event of the one or more events.

5. The method of claim 1, wherein the source type definition further includes one or more attributes related to extracting one or more fields from the data of the particular source type for each event of the one or more events.

6. The method of claim 1, wherein the value stored in association with the at least one of the one or more attributes comprises a regular expression.

7. The method of claim 1, wherein causing the one or more configuration files to be stored on one or more system components includes sending the one or more configuration files to two or more system components.

8. The method of claim 1, wherein causing the one or more configuration files to be stored on one or more system components of the plurality of system components is performed automatically in response to a user providing input to save the source type definition.

9. The method of claim 1, wherein the graphical user interface is a first graphical user interface, the method further comprising:
  causing display of a second graphical user interface displaying a list of existing source type definitions; and
  receiving a selection of a particular source type definition from the list of existing source type definitions,
  wherein the first graphical user interface is caused to be displayed in response to receiving the selection of the particular source type definition.

10. The method of claim 1, wherein the graphical user interface is a first graphical user interface, the method further comprising:

causing display of a second graphical user interface displaying a list of existing source type definitions, wherein the second graphical user interface includes one or more interface components to create a new source type definition or to delete an existing source type definition.

11. The method of claim 1, further comprising causing display of a preview displaying particular data of the particular source type parsed according to one or more particular attributes of the source type definition.

12. The method of claim 1, wherein the plurality of system components includes one or more of an indexer, a forwarder, and a search head.

13. The method of claim 1, wherein the data of the particular source type is one or more of a file, a directory of files, and a network event.

14. The method of claim 1, wherein causing the one or more configuration files to be stored on one or more system components includes sending the one or more configuration files to a master node configured to manage a cluster of indexers.

15. The method of claim 1, wherein causing the one or more configuration files to be stored on one or more system components includes sending the one or more configuration files to a search cluster master configured to manage a cluster of search heads.

16. The method of claim 1, wherein causing the one or more configuration files to be stored on one or more system components includes sending the one or more configuration files to a deployment server configured to manage one or more forwarders.

17. The method of claim 1, further comprising:

receiving, by a particular system component of the plurality of system components, particular data of the particular source type;

based at least in part on the value stored in the one or more configuration files:
generating a plurality of events from the particular data; and
determining a timestamp for each event of the plurality of events.

18. The method of claim 1, further comprising causing display of a preview displaying one or more events generated from particular data of the particular source type according to one or more particular attributes of the source type definition, and further displaying an indication of one or more fields parsed from the particular data.

19. Non-transitory, computer-readable storage media storing computer-executable instructions that, when executed by one or more computing devices of a data intake and query system, cause the one or more computing devices to:

cause display of a graphical user interface for configuring a source type definition corresponding to a particular source type of an information technology environment, the source type definition including a plurality of attribute-value pairs to enable the data intake and query system to generate one or more events from data of the particular source type, wherein the data of the particular source type is generated by at least one component in the information technology environment;

receive, via the graphical user interface, user input for a value associated with at least one attribute of the data of the particular source type, the at least one attribute corresponding to at least one attribute-value pair of the plurality of attribute-value pairs;

store, in one or more configuration files, the value in association with the at least one attribute as one of the plurality of attribute-value pairs; and cause the one or more configuration files to be stored on one or more system components of the data intake and query system.

20. The non-transitory, computer-readable storage media of claim 19, wherein the computer-executable instructions, when executed by the one or more computing devices, cause the system component to:

subsequent to causing the one or more configuration files to be stored on one or more system components of the data intake and query system, receive, by a particular system component of the data intake and query system, particular data associated with the particular source type; and generate a plurality of events from the particular data based at least in part on the value stored in the one or more configuration files.

21. The non-transitory, computer-readable storage media of claim 19, wherein the computer-executable instructions which, when executed by the one or more computing devices, cause the one or more computing devices to:

subsequent to causing the one or more configuration files to be stored on one or more system components of the plurality of system components, receive, by a search head, a query for data of the particular source type; and process, by the search head, the query based at least in part on the value stored in the one or more configuration files.

22. The non-transitory, computer-readable storage media of claim 19, wherein the source type definition further includes one or more attributes related to determining a timestamp for each event of the one or more events.

23. The non-transitory, computer-readable storage media of claim 19, wherein the source type definition further includes one or more attributes related to extracting one or more fields from the data of the particular source type for the one or more events.

24. The non-transitory, computer-readable storage media of claim 19, wherein the value stored in association with the at least one attribute comprises a regular expression.

25. The non-transitory, computer-readable storage media of claim 19, wherein to cause the one or more configuration files to be stored on one or more system components, the computer-executable instructions when executed, cause the one or more computing devices to send the one or more configuration files to two or more system components.

26. The non-transitory, computer-readable storage media of claim 19, wherein the computer-executable instructions, when executed, automatically cause the one or more computing devices to cause the one or more configuration files to be stored on the one or more system components of the data intake and query system in response to a user providing input to save the source type definition.

27. The non-transitory, computer-readable storage media of claim 19, wherein the graphical user interface is a first graphical user interface, and wherein the computer-executable instructions, when executed by the one or more computing devices, further cause the one or more computing devices to:

cause display of a second graphical user interface displaying a list of existing source type definitions; and receive a selection of a particular source type definition from the list of existing source type definitions, wherein the first graphical user interface is caused to be displayed in response to receiving the selection of the particular source type definition.

28. The non-transitory, computer-readable storage media of claim 19, wherein the computer-executable instructions, when executed by the one or more computing devices, cause display of a preview displaying particular raw machine data parsed according to one or more particular attributes of the source type definition.

29. The non-transitory, computer-readable storage media of claim 19, wherein the data intake and query system includes at least one of an indexer, a forwarder, or a search head.

30. A system, comprising:
one or more computing devices of a data intake and query system, the data intake and query system comprising a plurality of system components; and
non-transitory, computer-readable storage media in communication with the one or more computing devices and storing a local copy of one or more configuration files, wherein the one or more computing devices are configured to:

cause display of a graphical user interface for configuring a source type definition corresponding to a particular source type of an information technology environment, the source type definition including a plurality of attribute-value pairs to enable the data intake and query system to generate one or more events from data of the particular source type generated by at least one component in the information technology environment;

receive, via the graphical user interface, user input for a value associated with at least one attribute of the data of the particular source type, the at least one attribute corresponding to at least one attribute-value pair of the plurality of attribute-value pairs;

store in the one or more configuration files, the value in association with the at least one attribute as one of the plurality of attribute-value pairs; and cause the one or more configuration files to be stored on one or more system components of the data intake and query system.

* * * * *